US011002462B2

(12) United States Patent
Tsuda et al.

(10) Patent No.: US 11,002,462 B2
(45) Date of Patent: May 11, 2021

(54) HEAT-EXCHANGING VENTILATION DEVICE, METHOD FOR ATTACHING HEAT EXCHANGER, AND METHOD FOR DETACHING HEAT EXCHANGER

(71) Applicant: MITSUBISHI ELECTRIC CORPORATION, Tokyo (JP)

(72) Inventors: Keishi Tsuda, Tokyo (JP); Masaru Takada, Tokyo (JP); Ippei Momose, Tokyo (JP); Akira Hayashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 187 days.

(21) Appl. No.: 16/076,044

(22) PCT Filed: Feb. 19, 2016

(86) PCT No.: PCT/JP2016/054953
§ 371 (c)(1),
(2) Date: Aug. 7, 2018

(87) PCT Pub. No.: WO2017/141445
PCT Pub. Date: Aug. 24, 2017

(65) Prior Publication Data
US 2019/0285308 A1    Sep. 19, 2019

(51) Int. Cl.
*F24F 12/00* (2006.01)
*F24F 7/08* (2006.01)
(Continued)

(52) U.S. Cl.
CPC .............. *F24F 12/006* (2013.01); *F24F 7/08* (2013.01); *F28D 9/00* (2013.01); *F28D 21/0014* (2013.01);
(Continued)

(58) Field of Classification Search
CPC . F24F 7/08; F24F 12/006; F24F 13/30; F28D 9/00; F28F 9/007; F28F 9/0075; F28F 2280/00; F28F 2280/02
See application file for complete search history.

(56) References Cited

U.S. PATENT DOCUMENTS 4,377,201 A * 3/1983 Kruse .................... F24F 12/006
165/166
5,193,610 A * 3/1993 Morissette ............ F24F 12/006
165/54
(Continued)

FOREIGN PATENT DOCUMENTS

JP        S6488048 A      4/1989
JP        07049187 A  *   2/1995  ......... F28D 21/0014
(Continued)

OTHER PUBLICATIONS

Extended European Search Report dated Nov. 19, 2018, issued by the European Patent Office in corresponding European Application No. 16890586.7. (7 pages).
(Continued)

*Primary Examiner* — Eric S Ruppert
*Assistant Examiner* — Hans R Weiland
(74) *Attorney, Agent, or Firm* — Buchanan Ingersoll & Rooney PC

(57) ABSTRACT

A heat-exchanging ventilation device performs ventilation while exchanging heat between a supply airflow and a discharge airflow. The heat-exchanging ventilation device includes: a casing; a heat exchanger having a prism shape and accommodated in the casing to be insertable into and removable from the casing; a plurality of support members to support the heat exchanger in the casing; and a rotational force applying unit to apply a rotational force to the heat exchanger and rotate the heat exchanger. When a rotational force is applied to the heat exchanger in one direction by the
(Continued)

rotational force applying unit, the heat exchanger is pressed against the support members, and when application of a rotational force in the one direction by the rotational force applying unit is stopped, the heat exchanger becomes rotatable in another direction.

8 Claims, 11 Drawing Sheets

(51) Int. Cl.
    *F28G 9/00*     (2006.01)
    *F28F 9/007*     (2006.01)
    *F28D 9/00*     (2006.01)
    *F28D 21/00*     (2006.01)

(52) U.S. Cl.
    CPC ........ *F28F 9/0075* (2013.01); *F28F 2280/00* (2013.01)

(56) References Cited

U.S. PATENT DOCUMENTS

| | | | | |
|---|---|---|---|---|
| 5,490,557 A * | 2/1996 | Taylor | ................... | F24F 12/006 165/54 |
| 5,632,334 A * | 5/1997 | Grinbergs | ............. | F24F 12/006 165/232 |
| 5,660,228 A * | 8/1997 | Steege | ................... | F24F 12/006 165/145 |
| 6,962,191 B2 * | 11/2005 | Immel | ..................... | F24F 13/30 165/166 |
| 8,955,578 B2 | 2/2015 | Kwon et al. | | |
| 9,816,725 B2 | 11/2017 | Kwon et al. | | |
| 2007/0158049 A1 * | 7/2007 | Kim | ....................... | F24F 12/006 165/48.1 |
| 2008/0017362 A1 * | 1/2008 | Kwon | ................... | F28D 9/0062 165/166 |
| 2018/0180318 A1 * | 6/2018 | Shiomi | ................. | F24F 12/006 |

FOREIGN PATENT DOCUMENTS

| | | |
|---|---|---|
| JP | 07049187 A | 2/1995 |
| JP | 09-203547 A | 5/1997 |
| JP | 2008025982 A | 2/2008 |
| WO | 2017141444 A1 | 8/2017 |

OTHER PUBLICATIONS

European communication pursuant to Article 94(3) EPC dated Oct. 29, 2019 for corresponding European patent application No. 16890586. 7, 4 pages.
Office Action dated Nov. 5, 2019, by the Chinese Patent Office in corresponding Chinese Patent Application No. 201680081757.5 and partial English translation of the Office Action. (13 pages).
Office Action (Notification of Reasons for Refusal) dated Mar. 26, 2019, by the Japan Patent Office in corresponding Japanese Patent Application No. 2017-567932 and English translation of the Office Action. (6 pages).
International Search Report (PCT/ISA/210) dated May 24, 2016, by the Japanese Patent Office as the International Searching Authority for International Application No. PCT/JP2016/054953.
Office Action dated Oct. 31, 2017, by the Taiwanese Patent Office for Application No. 105123389.
Written Opinion (PCT/ISA/237) dated May 24, 2016, by the Japanese Patent Office as the International Searching Authority for International Application No. PCT/JP2016/054953.
Office Action dated Jul. 16, 2020, by the Chinese Patent Office in corresponding Chinese Patent Application No. 201680081757.5 and English translation of the Office Action. (13 pages).

* cited by examiner

HEAT-EXCHANGING VENTILATION DEVICE, METHOD FOR ATTACHING HEAT EXCHANGER, AND METHOD FOR DETACHING HEAT EXCHANGER

FIELD

The present invention relates to a heat-exchanging ventilation device that performs ventilation while exchanging heat between a supply airflow and a discharge airflow, and it also relates to a method for attaching a heat exchanger and a method for detaching a heat exchanger.

BACKGROUND

A heat-exchanging ventilation device that includes a heat exchanger that exchanges heat between a supply airflow and a discharge airflow is a known conventional ventilation device for ventilating a building. Patent Literature 1 discloses a heat-exchanging ventilation device in which rails are provided within a casing that accommodates therein a heat exchanger. The rails guide the sliding movement of the heat exchanger when it is inserted into and removed from the casing, and they also support the heat exchanger.

CITATION LIST

Patent Literature

Patent Literature 1: Japanese Patent Application Laid-open No. 2008-25982

SUMMARY

Technical Problem

With the heat-exchanging ventilation device disclosed in Patent Literature 1, in order to slide and move the heat exchanger smoothly along the rails, clearance needs to be provided between the heat exchanger and the rails. However, because the supply air passage through which a supply airflow passes and the discharge air passage through which a discharge airflow passes are adjacent to each other with a contact portion of the heat exchanger and the rail interposed between the supply air passage and the discharge air passage, there is a problem in that airflow leaks from one of the supply air passage and the discharge air passage to the other through the clearance between the heat exchanger and the rails, thereby causing contaminants contained in the discharge airflow to be mixed into the supply airflow as well as causing a reduction in heat exchange efficiency.

The present invention has been achieved to solve the above problems, and an object of the present invention is to provide a heat-exchanging ventilation device that can provide a smooth sliding movement of a heat exchanger and also ensure an airtight seal between the heat exchanger and the rails.

Solution to Problem

In order to solve the above problems and achieve the object, a heat-exchanging ventilation device according to an aspect of the present invention is a heat-exchanging ventilation device to perform ventilation while exchanging heat between a supply airflow and a discharge airflow. The heat-exchanging ventilation device includes: a casing; a heat exchanger having a prism shape and accommodated in the casing to be insertable into and removable from the casing; a plurality of support members to support the heat exchanger in the casing; and a rotational force applying unit to apply a rotational force to the heat exchanger and rotate the heat exchanger. When a rotational force is applied to the heat exchanger in one direction by the rotational force applying unit, the heat exchanger is pressed against the support members, and when application of a rotational force in the one direction by the rotational force applying unit is stopped, the heat exchanger becomes rotatable in another direction.

Advantageous Effects of Invention

According to the heat-exchanging ventilation device of the present invention, there is an effect where it is possible to provide a smooth sliding movement of a heat exchanger and ensure an airtight seal between the heat exchanger and the rails.

DESCRIPTION OF EMBODIMENTS

A heat-exchanging ventilation device, a method for attaching a heat exchanger, and a method for detaching the heat exchanger according to embodiments of the present invention will be described in detail below with reference to the accompanying drawings. The present invention is not limited to the embodiments.

First Embodiment

Figure 1:
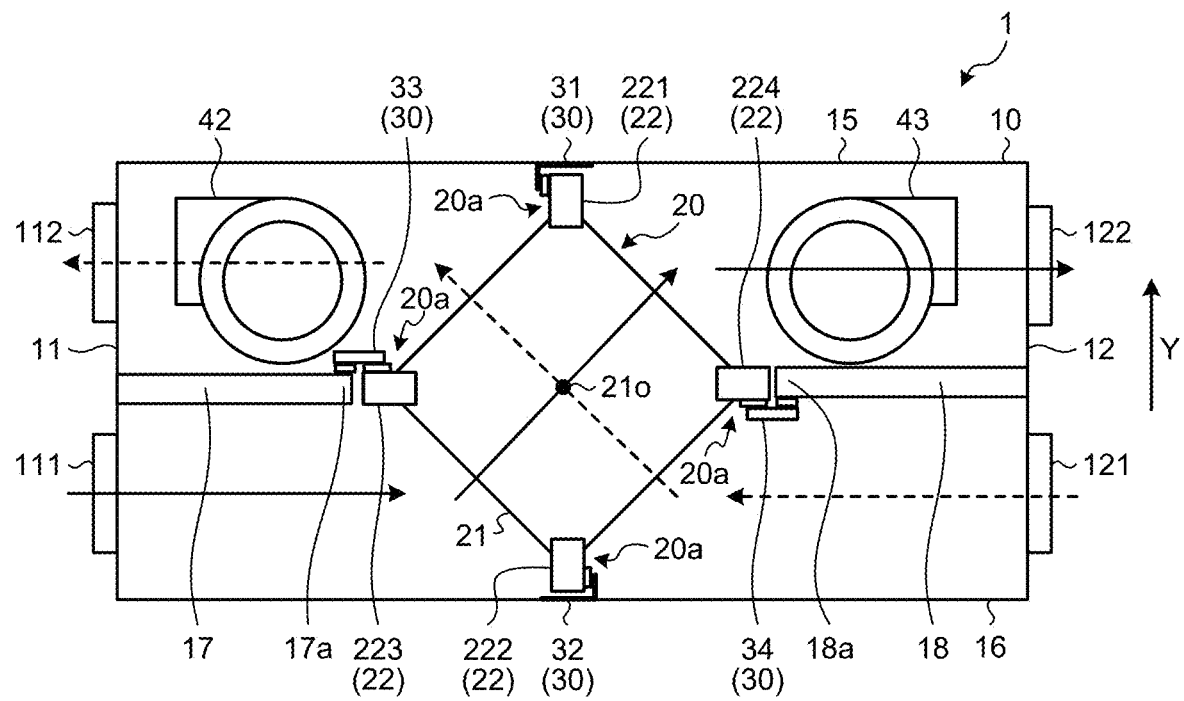
FIG. 1 is a schematic front view illustrating a heat-exchanging ventilation device according to a first embodiment.
Figure 2:
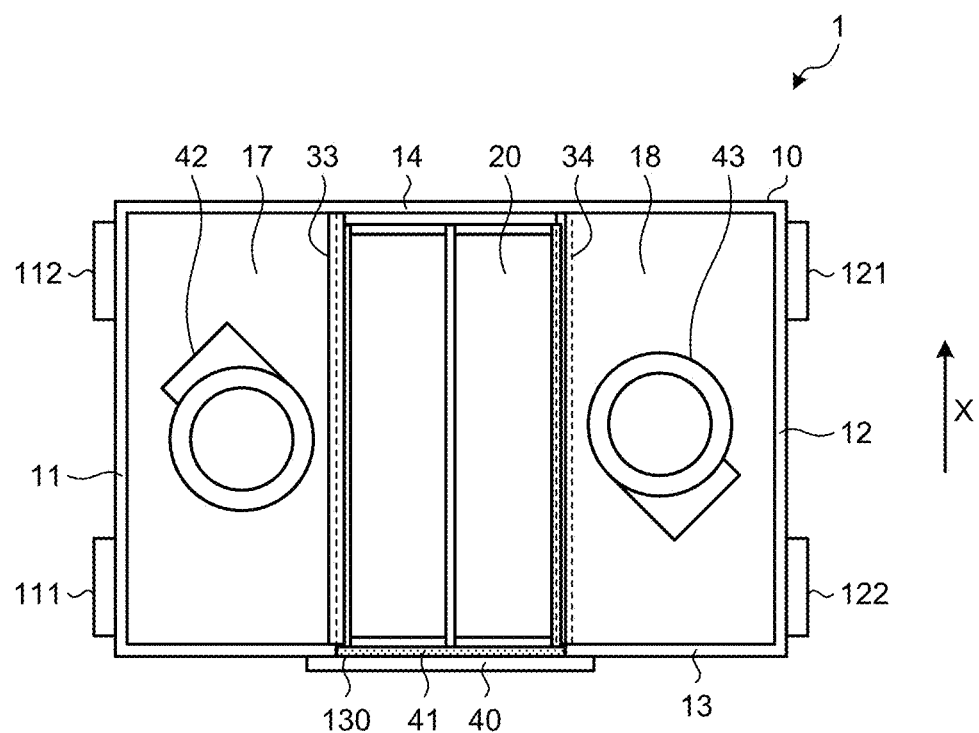
FIG. 2 is a schematic plan view illustrating the heat-exchanging ventilation device according to the first embodiment.

FIG. 1 is a schematic front view illustrating a heat-exchanging ventilation device 1 according to a first embodiment. FIG. 2 is a schematic plan view illustrating the heat-exchanging ventilation device 1 according to the first embodiment. The heat-exchanging ventilation device 1 is a total-heat-exchanging ventilation device that is installed in a ceiling space to supply and discharge air through a duct (not illustrated). The heat-exchanging ventilation device 1 includes a casing 10 that constitutes a housing; a heat exchanger 20 having a prism shape (a quadrangular prism shape in the first embodiment) and accommodated in the casing 10 to be insertable into and removable from the casing 10; and a plurality of support members 30 that support the heat exchanger 20 in the casing 10.

The casing 10 is formed into a hexahedral shape including a first side plate 11 located on the exterior side; a second side plate 12 located on the interior side and opposed to the first side plate 11; a third side plate 13 extending between the first side plate 11 and the second side plate 12; a fourth side plate 14 extending between the first side plate 11 and the second side plate 12 and opposed to the third side plate 13; a top plate 15 mounted on the top of the first side plate 11, the second side plate 12, the third side plate 13, and the fourth side plate 14; and a bottom plate 16 mounted at the bottom of the first side plate 11, the second side plate 12, the third side plate 13, and the fourth side plate 14. When the heat-exchanging ventilation device 1 is in an installed state, the casing 10 is positioned with the top plate 15 located on the upper side in a vertical direction Y and with the bottom plate 16 located on the lower side in the vertical direction Y.

An exterior-side inlet port 111 through which outside air is drawn in and an exterior-side discharge port 112 through which indoor air is discharged outdoors are provided on the first side plate 11. An interior-side inlet port 121 through which indoor air is drawn in and an interior-side outlet port 122 through which the outside air drawn in from the exterior-side inlet port 111 is supplied indoors are provided on the second side plate 12. As illustrated in FIG. 2, the third side plate 13 includes a maintenance opening 130 through which the heat exchanger 20 is insertable into and removable from the casing 10. Further, a maintenance cover 40 that covers the maintenance opening 130 is removably attached to the third side plate 13. A sealing member 41 is affixed to the inner side of the maintenance cover 40, and it comes into contact with the end surface of the heat exchanger 20 and with the inner peripheral surface of the maintenance opening 130.

The casing 10 includes a first casing 17 and a second casing 18 that define a supply air passage and a discharge air passage as air passages that are independent from each other. The supply air passage communicates the exterior-side inlet port 111 with the interior-side outlet port 122 and a supply airflow passes through the supply air passage in the direction illustrated by the solid arrow in FIG. 1. The discharge air passage communicates the interior-side inlet port 121 with the exterior-side discharge port 112 and a discharge airflow passes through the discharge air passage in the direction illustrated by the dotted arrow in FIG. 1. The first casing 17 holds a discharge air blower 42 that is located somewhere along the discharge air passage to generate discharge airflow. The second casing 18 holds a supply air blower 43 that is located somewhere along the supply air passage to generate supply airflow.

As illustrated in FIG. 1, the heat exchanger 20 is located somewhere along the supply air passage and the discharge air passage in the central portion of the casing 10, and it forms a part of the supply air passage and a part of the discharge air passage. As illustrated in FIG. 1, the heat exchanger 20 is supported at its four corner portions 20a by a plurality of support members 30 fixed to the casing 10.

Figure 3:
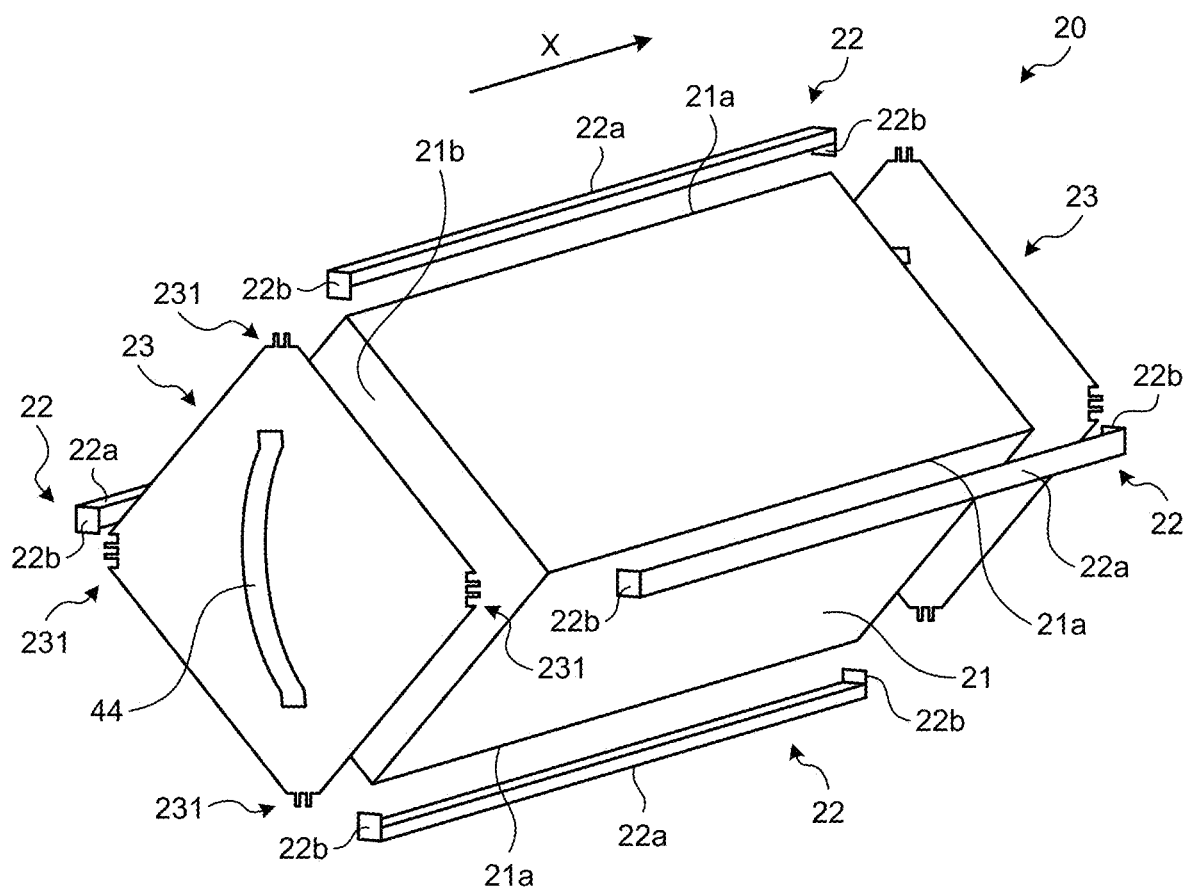
FIG. 3 is an exploded perspective view illustrating a heat exchanger according to the first embodiment.
Figure 4:
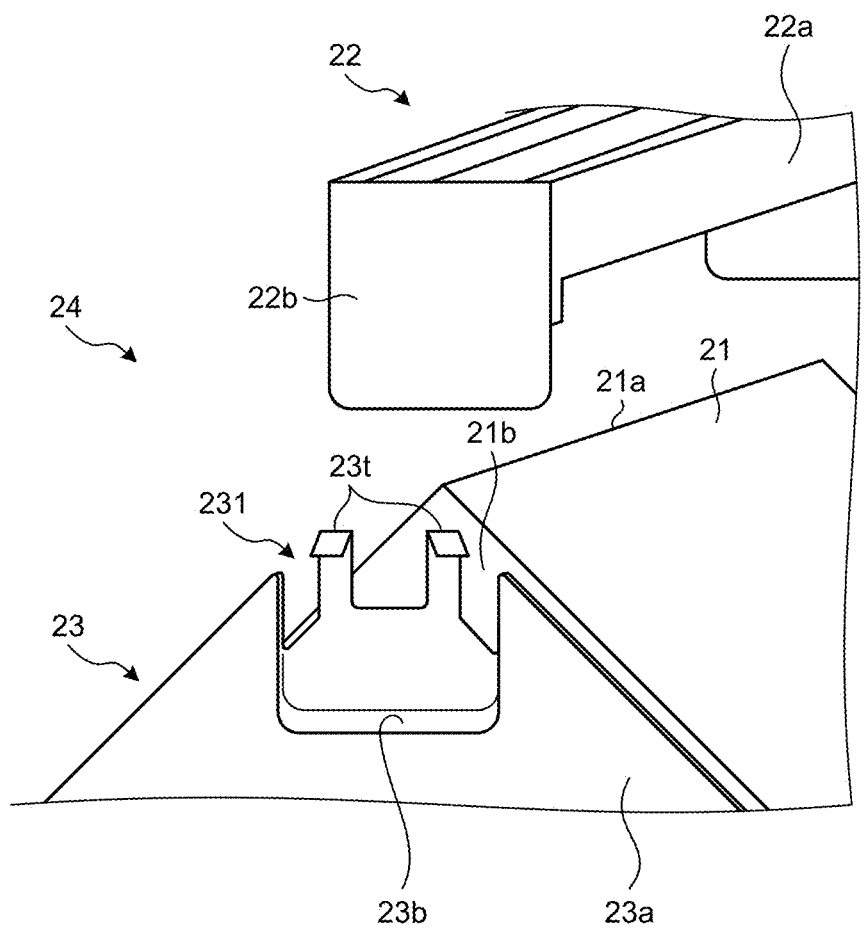
FIG. 4 is an enlarged diagram illustrating the main parts of the heat exchanger according to the first embodiment.

The configuration of the heat exchanger 20 is described below. FIG. 3 is an exploded perspective view illustrating the heat exchanger 20. FIG. 4 is an enlarged diagram illustrating the main parts of the heat exchanger 20. The heat exchanger 20 includes a heat exchange element 21 having a prism shape; four frame members 22 that are attached to respective sides 21a extending in an axial direction X of the heat exchange element 21; and two cover members 23 that cover respective end surfaces 21b, the end surfaces 21b being perpendicular to the axial direction X of the heat exchange element 21 and the frame members 22 being connected to the cover members 23. In the first embodiment, while the number of the frame members 22 is four, the number thereof is not limited to four.

The heat exchange element 21 is made from specially processed paper, and it has a prism shape with a square cross section taken along a plane perpendicular to the axial direction X. The heat exchange element 21 may have a rectangular cross section taken along a plane perpendicular to the axial direction X or it may have a polygonal cross section taken along a plane perpendicular to the axial direction X. That is, the heat exchanger 20 may be formed into a polygonal columnar shape. Although illustrations of a detailed configuration are omitted, the heat exchange element 21 includes a plurality of supply air passages through which supply air passes and a plurality of discharge air passages through which discharge air passes. The supply air passages and the discharge air passages cross each other as air passages that are independent from each other.

As illustrated in FIGS. 3 and 4, each of the frame members 22 includes a frame body 22a extending in the axial direction X of the heat exchange element 21 and convex portions 22b provided at both ends of the frame body 22a and extending in a direction perpendicular to the axial direction X of the heat exchange element 21. The frame body 22a is formed such that it can come into contact with the side 21a of the heat exchange element 21. Adhesive or sealant is applied to the portion of the frame body 22a that is in contact with the side 21a. With this configuration, each of the frame members 22 is bonded and fixed to a corresponding one of the sides 21a of the heat exchange element 21.

As illustrated in FIG. 4, the cover member 23 includes a cover body 23a that is formed into a square shape along the end surface 21b of the heat exchange element 21 and that comes into contact with the end surface 21b, and a plurality of concave portions 23b that are formed respectively at four corner portions 231 on the surface of the cover body 23a on the other side of the contact surface with the end surface 21b of the heat exchange element 21, with the concave portions 23b being recessed toward the end surface 21b of the heat exchange element 21. A handle 44 for use during maintenance is mounted on the surface of the cover body 23a on the other side of the surface facing the heat exchange element 21.

Figure 5:
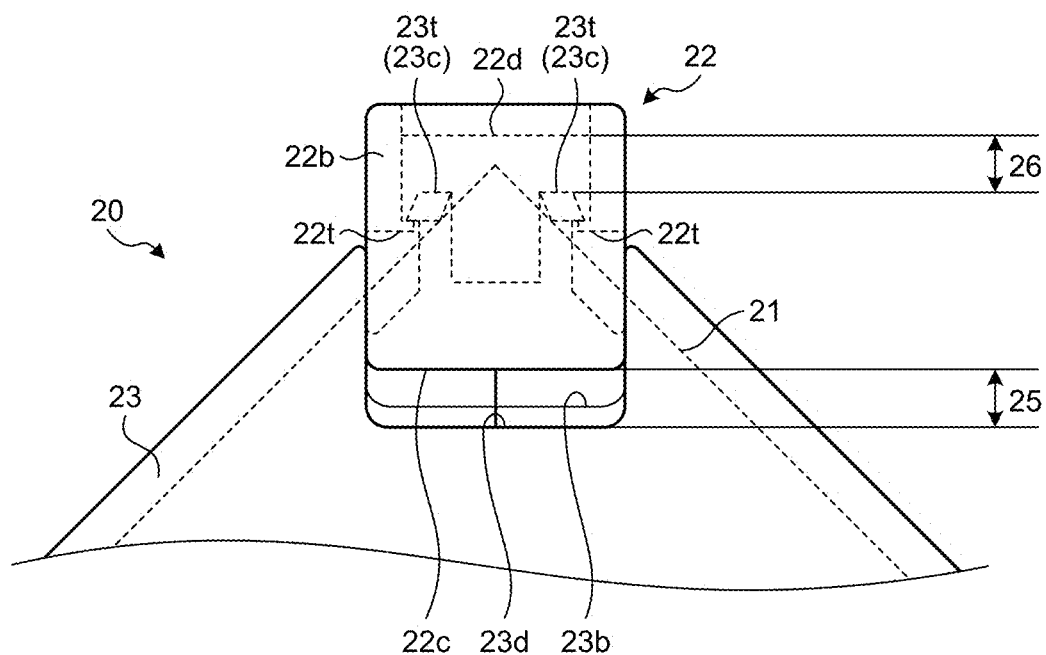
FIG. 5 is an explanatory diagram illustrating a connecting portion between a frame member and a cover member of the heat exchanger according to the first embodiment.
Figure 6:
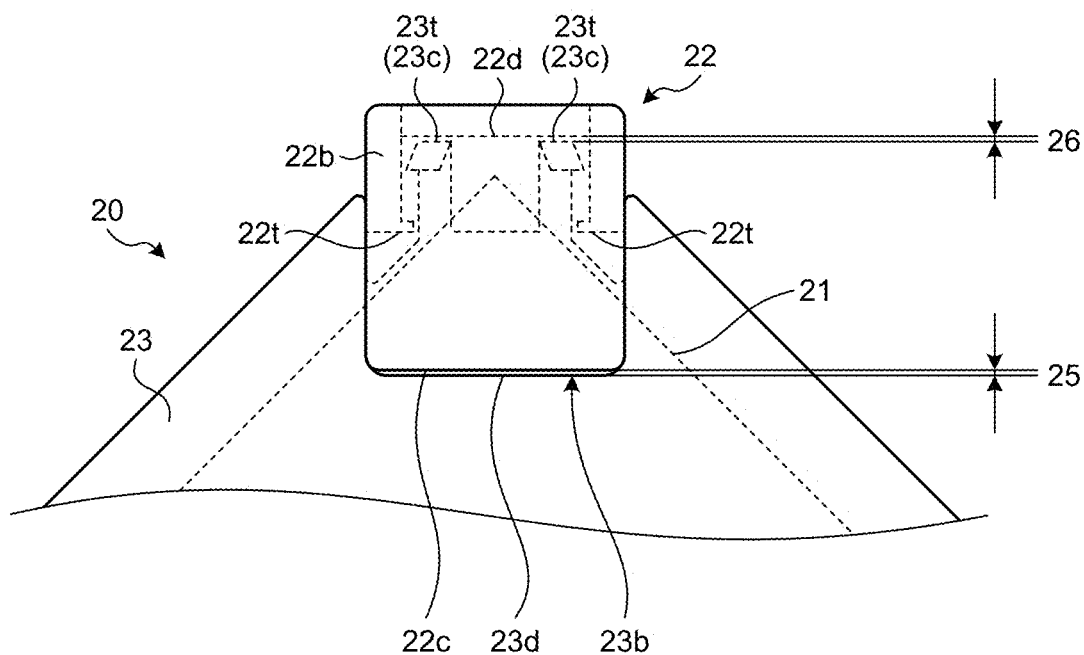
FIG. 6 is an explanatory diagram illustrating the connecting portion between the frame member and the cover member of the heat exchanger according to the first embodiment.

The frame members 22 and the cover member 23 are connected at connecting portions 24. The connecting portion 24 includes the convex portion 22b of the frame member 22 and the concave portion 23b of the cover member 23, which are described above. FIGS. 5 and 6 are explanatory diagrams illustrating the connecting portion 24 of the frame member 22 and the cover member 23 in the heat exchanger 20. As illustrated in FIG. 5, the convex portion 22b of the frame member 22 is fitted in the concave portion 23b of the cover member 23 in a slidable manner in a direction perpendicular to the axial direction X of the heat exchange element 21. The convex portion 22b covers the concave portion 23b from the side opposite to the heat exchange element 21.

As illustrated in FIG. 5, the convex portion 22b of the frame member 22 includes frame-side hook portions 22t protruding inward from both sides of the convex portion 22b between a distal end 22c of the convex portion 22b (hereinafter, "convex distal end 22c") and a base end 22d of the convex portion 22b (hereinafter, "convex base end 22d"). The concave portion 23b of the cover member 23 includes two cover-side hook portions 23t having a hook-like shape to be capable of being hooked on the frame-side hook portions 22t of the frame member 22. The frame-side hook portions 22t and the cover-side hook portions 23t can be connected with each other by a snap fit. This can prevent the convex portion 22b and the concave portion 23b from being easily detached from each other. Thus, during the assembly process, at the time of attaching one end side of the frame member 22 to the cover member 23, and thereafter attaching the other end side thereto, the frame member 22 can be prevented from being detached from the cover member 23. Consequently, the frame member 22 and the cover member 23 can be easily connected to each other. In this manner, the cover members 23 are brought into contact with the end surfaces 21b of the heat exchange element 21 and also the frame members 22 bonded to the respective sides 21a of the heat exchange element 21 are connected to the cover members 23. Therefore, the shape of the heat exchange element 21 made from specially processed paper can be stably maintained.

As illustrated in FIG. 5, clearances 25 and 26 are provided for the connecting portion 24 of the frame member 22 and the cover member 23. The clearances 25 and 26 allow the frame member 22 to move in a direction perpendicular to the axial direction X of the heat exchange element 21. The clearance 25 is provided between the convex distal end 22c of the convex portion 22b of the frame member 22 and a concave base end 23d of the concave portion 23b of the cover member 23. The clearance 26 is provided between the convex base end 22d of the convex portion 22b of the frame member 22 and a concave distal end 23c of the concave portion 23b of the cover member 23. In the first embodiment, the concave distal end 23c refers to a distal end of the cover-side hook portions 23t.

Figure 7:
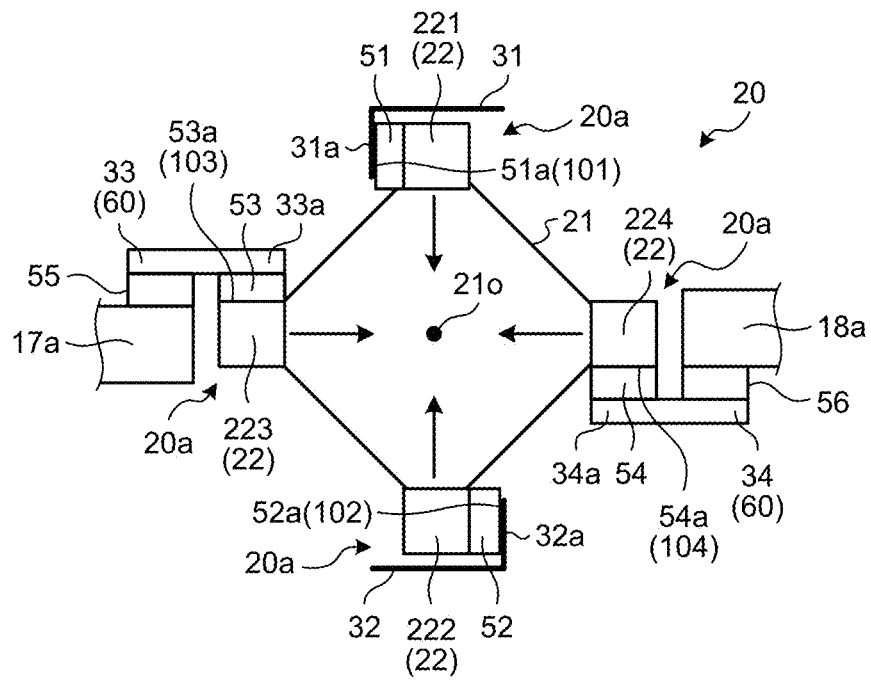
FIG. 7 is a schematic diagram illustrating the directions in which a heat exchange element of the heat exchanger according to the first embodiment contracts.

As the heat-exchanging ventilation device 1 is used over a long period of time, the heat exchange element 21 may be repeatedly exposed to dry and moist air passing through the heat-exchanging ventilation device 1, and it may expand and contract. FIG. 7 is a schematic diagram illustrating the directions in which the heat exchange element 21 contracts. The heat exchange element 21 contracts toward an axial center 21o. As described above, in the heat exchanger 20 according to the first embodiment, the clearances 25 and 26 that allow the frame member 22 to move in a direction perpendicular to the axial direction X of the heat exchange element 21 are provided for the connecting portion 24 of the frame member 22 and the cover member 23. This configuration makes it possible for the frame member 22 to move in a direction approaching the axial center 21o of the heat exchange element 21 by the clearances 25 and 26 as illustrated in FIG. 6 even when the heat exchange element 21 contracts toward the axial center 21o.

As described above, when the heat exchange element 21 contracts toward the axial center 21o because of long-term use of the heat-exchanging ventilation device 1, the frame members 22 move in accordance with the deformation of the heat exchange element 21. This can satisfactorily prevent deformation of the frame members 22, prevent separation of the heat exchange element 21 and the frame members 22 from each other, and minimize deformation of and damage to the heat exchange element 21. Therefore, the heat-exchanging ventilation device 1 prevents formation of a gap between the heat exchange element 21 and the frame members 22, and it also prevents formation of a gap within the heat exchange element 21. Thus, it is possible for the heat-exchanging ventilation device 1 to satisfactorily minimize changes in the amount of ventilation air that is caused by airflow leakage from one of the supply air passage and the discharge air passage to the other, minimize mixing of contaminants contained in a discharge airflow into a supply airflow, and prevent a reduction in heat exchange efficiency.

In the first embodiment, it is preferable that all the clearances 25 and 26 are identical in length and that the length of the clearances 25 and 26 is half the maximum length of contraction of the heat exchange element 21 caused by long-term use thereof. By making all the clearances 25 and 26 identical in length, it is possible to minimize any unevenness in the movable amount of the diagonally opposite frame members 22 and to satisfactorily minimize displacement of the axial center 21o of the heat exchange element 21 from its initial position when the heat exchange element 21 is attached.

By making the length of the clearances 25 and 26 half the maximum length of contraction of the heat exchange element 21 and by allowing the frame members 22 to move in accordance with deformation of the heat exchange element 21 by at least the clearances 25 and 26, it is possible to satisfactorily prevent deformation of the frame members 22, prevent separation of the heat exchange element 21 and the frame members 22 from each other, and minimize deformation of and damage to the heat exchange element 21.

Next, the configuration to support the heat exchanger 20 in the casing 10 is described. In the following descriptions, the frame member 22 attached to the side 21a of the heat exchange element 21 that is closer to the top plate 15 (on the top side in FIG. 1) is referred to as a "first frame member 221". Further, the frame member 22 attached to the side 21a of the heat exchange element 21 that is closer to the bottom plate 16 (on the bottom side in FIG. 1) is referred to as a "second frame member 222". Further, the frame member 22 attached to the side 21a of the heat exchange element 21 that is closer to the first side plate 11 (on the left side in FIG. 1) is referred to as a "third frame member 223". Further, the frame member 22 attached to the side 21a of the heat exchange element 21 that is closer to the second side plate 12 (on the right side in FIG. 1) is referred to as a "fourth frame member 224".

Figure 8:
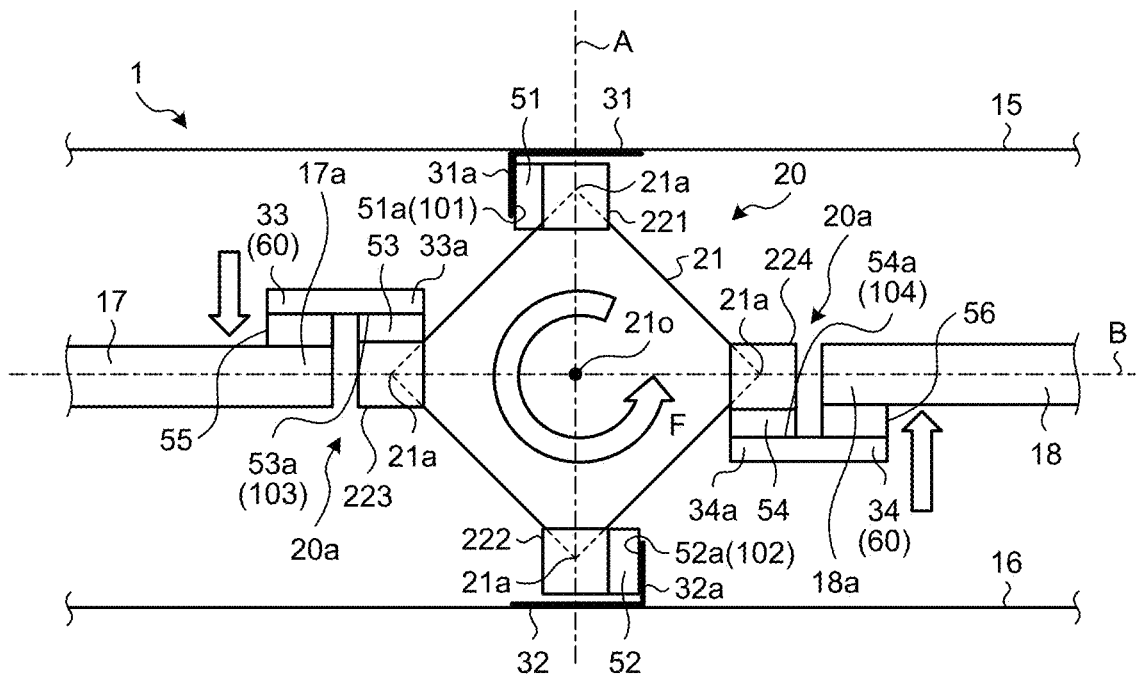
FIG. 8 is a schematic diagram illustrating the heat exchanger attached to a casing.
Figure 9:
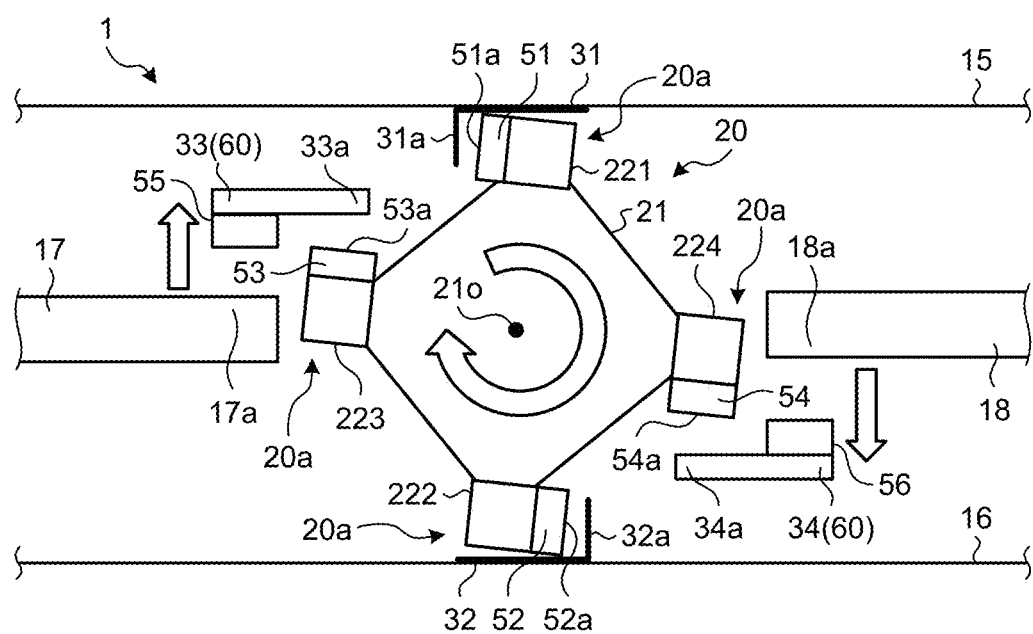
FIG. 9 is a schematic diagram illustrating the heat exchanger when it is inserted into and removed from the casing.

FIG. 8 is a schematic diagram illustrating the heat exchanger 20 attached to the casing 10. FIG. 9 is a schematic diagram illustrating the heat exchanger 20 when it is inserted into and removed from the casing 10. As illustrated in FIGS. 8 and 9, the heat exchanger 20 is rotatable within the casing 10 in one direction indicated by the circular arrow in FIG. 8, and it is rotatable within the casing 10 in the other direction indicated by the circular arrow in FIG. 9.

As illustrated in FIG. 8, a sealing member 51 is affixed to the first frame member 221 of the heat exchanger 20 along the frame body 22a. When the heat exchanger 20 is attached, an end surface 51a of the sealing member 51, which faces toward the first side plate 11, extends parallel to a plane A that passes through the side 21a of the heat exchange element 21 that is closer to the top plate 15, passes through the side 21a of the heat exchange element 21 that is closer to the bottom plate 16, and passes through the axial center 210 of the heat exchange element 21 (hereinafter, simply referred to as "plane A"). A sealing member 52 is affixed to the second frame member 222 of the heat exchanger 20 along the frame body 22a. An end surface 52a of the sealing member 52, which faces toward the second side plate 12, extends parallel to the plane A.

A sealing member 53 is affixed to the third frame member 223 of the heat exchanger 20 along the frame body 22a. When the heat exchanger 20 is attached, an end surface 53a of the sealing member 53, which faces toward the top plate 15, extends parallel to a plane B that passes through the side 21a of the heat exchange element 21 that is closer to the first side plate 11, passes through the side 21a of the heat exchange element 21 that is closer to the second side plate 12, and passes through the axial center 210 of the heat exchange element 21 (hereinafter, simply referred to as "plane B"). A sealing member 54 is affixed to the fourth frame member 224 of the heat exchanger 20 along the frame body 22a. An end surface 54a of the sealing member 54, which faces toward the bottom plate 16, extends parallel to the plane B.

As described above, the heat exchanger 20 is supported by the support members 30. As illustrated in FIG. 8, the support members 30 are located surrounding the heat exchanger 20. The support members 30 include a first fixed rail 31 and a second fixed rail 32 that are fixed to the casing 10, and they also includes a first movable rail 33 and a second movable rail 34 that are supported by the casing 10 such that they are movable in a direction perpendicular to the axial direction X of the heat exchange element 21. The first movable rail 33 and the second movable rail 34 also function as a rotational force applying unit 60 that applies a rotational force F to the heat exchanger 20 in the one direction indicated by the circular arrow in FIG. 8.

The first fixed rail 31 extends in the axial direction X of the heat exchange element 21 and is fixed to the top plate 15 at the central portion of the casing 10. The first fixed rail 31 includes a first contact portion 31a that extends in the axial direction X of the heat exchange element 21 and that is formed in front of the first frame member 221 in the one direction, i.e., the direction indicated by the circular arrow in FIG. 8. The first contact portion 31a extends parallel to the plane A, and it is formed such that it can come into contact with the end surface 51a of the sealing member 51 affixed to the first frame member 221. That is, a contact surface 101 between the end surface 51a of the sealing member 51 affixed to the first frame member 221 and the first contact portion 31a of the first fixed rail 31 extends parallel to the plane A.

The second fixed rail 32 extends in the axial direction X of the heat exchange element 21 and is fixed to the bottom plate 16 at the central portion of the casing 10. The second fixed rail 32 includes a first contact portion 32a that extends in the axial direction X of the heat exchange element 21 and that is formed in front of the second frame member 222 in the one direction, i.e., the direction indicated by the circular arrow in FIG. 8. The first contact portion 32a extends parallel to the plane A, and it is formed such that it can come into contact with the end surface 52a of the sealing member 52 affixed to the second frame member 222. That is, a contact surface 102 between the end surface 52a of the sealing member 52 affixed to the second frame member 222 and the first contact portion 32a of the second fixed rail 32 extends parallel to the plane A.

As illustrated in FIG. 2, the first movable rail 33 and the second movable rail 34 extend in the axial direction X of the heat exchange element 21 and are supported by the third side plate 13 and the fourth side plate 14 of the casing 10 such that they are movable in a direction perpendicular to the axial direction X of the heat exchange element 21 and in the vertical direction Y. As illustrated in FIG. 8, the first movable rail 33 and the second movable rail 34 are provided singly on opposite sides across the plane A. In the first embodiment, the first movable rail 33 includes a filter support portion 33b that supports a filter 45 located along the lower edge of the heat exchanger 20 (see FIG. 10). In the first embodiment, the second movable rail 34 includes a filter support portion 34b that supports a filter 46 located along the lower edge of the heat exchanger 20 (see FIG. 10).

The first casing 17, which defines the supply air passage and the discharge air passage, includes an end portion 17a located on the side where the heat exchanger 20 is present. The first movable rail 33 is located on the upper side of the end portion 17a, i.e., on the side closer to the top plate 15 than the end portion 17a is, and simultaneously on the upper side of the third frame member 223, i.e., on the side closer to the top plate 15 than the third frame member 223 is. A sealing member 55 is affixed to the surface of the first movable rail 33 facing the end portion 17a of the first casing 17. The first movable rail 33 can come into contact with the end portion 17a of the first casing 17 via the sealing member 55. The first movable rail 33 includes a second contact portion 33a that extends in the axial direction X of the heat exchange element 21 and that is formed in front of the third frame member 223 in the other direction, i.e., the direction indicated by the circular arrow in FIG. 9. The second contact portion 33a extends parallel to the plane B and is formed such that it can come into contact with the end surface 53a of the sealing member 53 affixed to the third frame member 223. That is, a contact surface 103 between the end surface 53a of the sealing member 53 affixed to the third frame member 223 and the second contact portion 33a of the first movable rail 33 extends parallel to the plane B.

The second casing 18, which defines the supply air passage and the discharge air passage, includes an end portion 18a located on the side where the heat exchanger 20 is present. The second movable rail 34 is located on the lower side of the end portion 18a, i.e., on the side closer to the bottom plate 16 than the end portion 18a is, and simultaneously on the lower side of the fourth frame member 224, i.e., on the side closer to the bottom plate 16 than the fourth frame member 224 is. A sealing member 56 is affixed to the surface of the second movable rail 34 facing the end portion 18a of the second casing 18. The second movable rail 34 can come into contact with the end portion 18a of the second casing 18 via the sealing member 56. The second movable rail 34 includes a second contact portion 34a that extends in the axial direction X of the heat exchange element 21 and that is formed in front of the fourth frame member 224 in the other direction, i.e., the direction indicated by the circular arrow in FIG. 9. The second contact portion 34a extends parallel to the plane B and is formed such that it can come into contact with the end surface 54a of the sealing member 54 affixed to the fourth frame member 224. That is, a contact surface 104 between the end surface 54a of the sealing member 54 affixed to the fourth frame member 224 and the second contact portion 34a of the second movable rail 34 extends parallel to the plane B.

In the heat-exchanging ventilation device 1 configured as described above, at the time of attaching the heat exchanger 20 to the casing 10, first, the first movable rail 33 is moved upward, i.e., toward the top plate 15, to be separated from the end portion 17a of the first casing 17 as illustrated in FIG. 9. Simultaneously, the second movable rail 34 is moved downward, i.e., toward the bottom plate 16, to be separated from the end portion 18a of the second casing 18. With this movement, as illustrated in FIG. 9, the sealing member 51 affixed to the first frame member 221 of the heat exchanger 20 and the first contact portion 31a of the first fixed rail 31 are separated from each other. Further, the sealing member 52 affixed to the second frame member 222 and the first contact portion 32a of the second fixed rail 32 are separated from each other. Further, the sealing member 53 affixed to the third frame member 223 and the second contact portion 33a of the first movable rail 33 are separated from each other. Further, the sealing member 54 affixed to the fourth frame member 224 and the second contact portion 34a of the second movable rail 34 are separated from each other. In this state, the heat exchanger 20 can be easily slid and inserted into the casing 10 from the maintenance opening 130 formed in the third side plate 13. At the time of inserting the heat exchanger 20 into the casing 10, the sealing members 51, 52, 53, and 54 can avoid coming into contact with the first fixed rail 31, the second fixed rail 32, the first movable rail 33, and the second movable rail 34. Therefore, the sealing members 51, 52, 53, and 54 can be satisfactorily protected.

Thereafter, as illustrated in FIG. 8, the first movable rail 33 is moved downward, i.e., toward the bottom plate 16, and is fixed in position, so that the sealing member 55 of the first movable rail 33 is pressed against the end portion 17a of the first casing 17 and the second contact portion 33a of the first movable rail 33 is pressed against the end surface 53a of the sealing member 53 affixed to the third frame member 223. As a result, the second contact portion 33a of the first movable rail 33 presses the third frame member 223 downward via the end surface 53a of the sealing member 53. Further, the second movable rail 34 is moved upward, i.e., toward the top plate 15, and is fixed in position, so that the sealing member 56 of the second movable rail 34 is pressed against the end portion 18a of the second casing 18 and the second contact portion 34a of the second movable rail 34 is pressed against the end surface 54a of the sealing member 54 affixed to the fourth frame member 224. As a result, the second contact portion 34a of the second movable rail 34 presses the fourth frame member 224 upward via the end surface 54a of the sealing member 54.

Consequently, the rotational force F is applied to the heat exchanger 20 in the one direction indicated by the circular arrow in FIG. 8. Thus, the end surface 51a of the sealing member 51 affixed to the first frame member 221 is pressed against the first contact portion 31a of the first fixed rail 31. Simultaneously, the end surface 52a of the sealing member 52 affixed to the second frame member 222 is pressed against the first contact portion 32a of the second fixed rail 32. As a result, the four corner portions 20a of the heat exchanger 20, i.e., all the frame members 22, are pressed against the support members 30. The heat exchanger 20 is thereby supported by the support members 30 in the casing 10. The sealing members 51, 52, 53, and 54 affixed respectively to the four corner portions 20a of the heat exchanger 20, i.e., to the frame members 22, are pressed against the support members 30. Thus, the sealing members 51, 52, 53, 54, 55, and 56 are sufficiently compressed so that airflow leakage between the supply air passage and the discharge air passage can be minimized. As a result, mixing of contaminants contained in a discharge airflow into a supply airflow can be minimized and a reduction in heat exchange efficiency can be prevented. Further, an airtight seal between the supply air passage and the discharge air passage can be ensured. Consequently, controllability of the amount of air to be delivered through the supply air passage and the discharge air passage can be improved. Because the static pressure is reduced at a connection portion of a duct (not illustrated) and the casing 10, power consumption can be reduced by reducing the capacity of the electric motor that delivers airflow to the heat-exchanging ventilation device 1.

As described above, the contact surface 101 between the end surface 51a of the sealing member 51 affixed to the first frame member 221 and the first contact portion 31a of the first fixed rail 31 extends parallel to the plane A, and the contact surface 102 between the end surface 52a of the sealing member 52 affixed to the second frame member 222 and the first contact portion 32a of the second fixed rail 32 also extends parallel to the plane A. Further, the contact surface 103 between the end surface 53a of the sealing member 53 affixed to the third frame member 223 and the second contact portion 33a of the first movable rail 33 extends parallel to the plane B, and the contact surface 104 between the end surface 54a of the sealing member 54 affixed to the fourth frame member 224 and the second contact portion 34a of the second movable rail 34 also extends parallel to the plane B.

With this configuration, even when the heat exchange element 21 contracts toward the axial center 21o, i.e., contracts along the directions parallel to the plane A and the plane B, due to long-term use as illustrated in FIG. 7, compression of the sealing members 51, 52, 53, and 54 can still be maintained. Further, even when the heat exchange element 21 contracts toward the axial center 21o, i.e., contracts along the directions parallel to the plane A and the plane B, and thus the frame members 22 of the heat exchanger 20 move toward the axial center 21o in accordance with contraction deformation of the heat exchange element 21, a sufficient length of the contact surfaces 101, 102, 103, and 104 can still be maintained. As a result, the sealing properties are maintained between the supply air passage and the discharge air passage over a long time.

Meanwhile, when the heat exchanger 20 is removed from the casing 10, as illustrated in FIG. 9, the first movable rail 33 is moved upward to be separated from the end portion 17a of the first casing 17 and the end surface 53a of the sealing member 53 affixed to the third frame member 223 and the second movable rail 34 is moved downward to be separated from the end portion 18a of the second casing 18 and the end surface 54a of the sealing member 54 affixed to the fourth frame member 224. As a result, the rotational force F in the one direction, which is applied by the first movable rail 33 and the second movable rail 34 to the heat exchanger 20 when it is in an attached state, is stopped. It is thus possible to rotate the heat exchanger 20 in the other direction indicated by the circular arrow in FIG. 9.

When the heat exchanger 20 is rotated in the other direction indicated by the circular arrow in FIG. 9, through the maintenance opening 130 in the third side plate 13 of the casing 10, the end surface 51a of the sealing member 51 affixed to the first frame member 221 can be separated from the first fixed rail 31 and the end surface 52a of the sealing member 52 affixed to the second frame member 222 can be separated from the second fixed rail 32. As a result, it is possible to easily slide the heat exchanger 20 and remove it from the casing 10. When the heat exchanger 20 is removed from the casing 10, the sealing members 51, 52, 53, and 54 can avoid coming into contact with the first fixed rail 31, the second fixed rail 32, the first movable rail 33, and the second movable rail 34, thereby satisfactorily protecting the sealing members 51, 52, 53, and 54.

Figure 10:
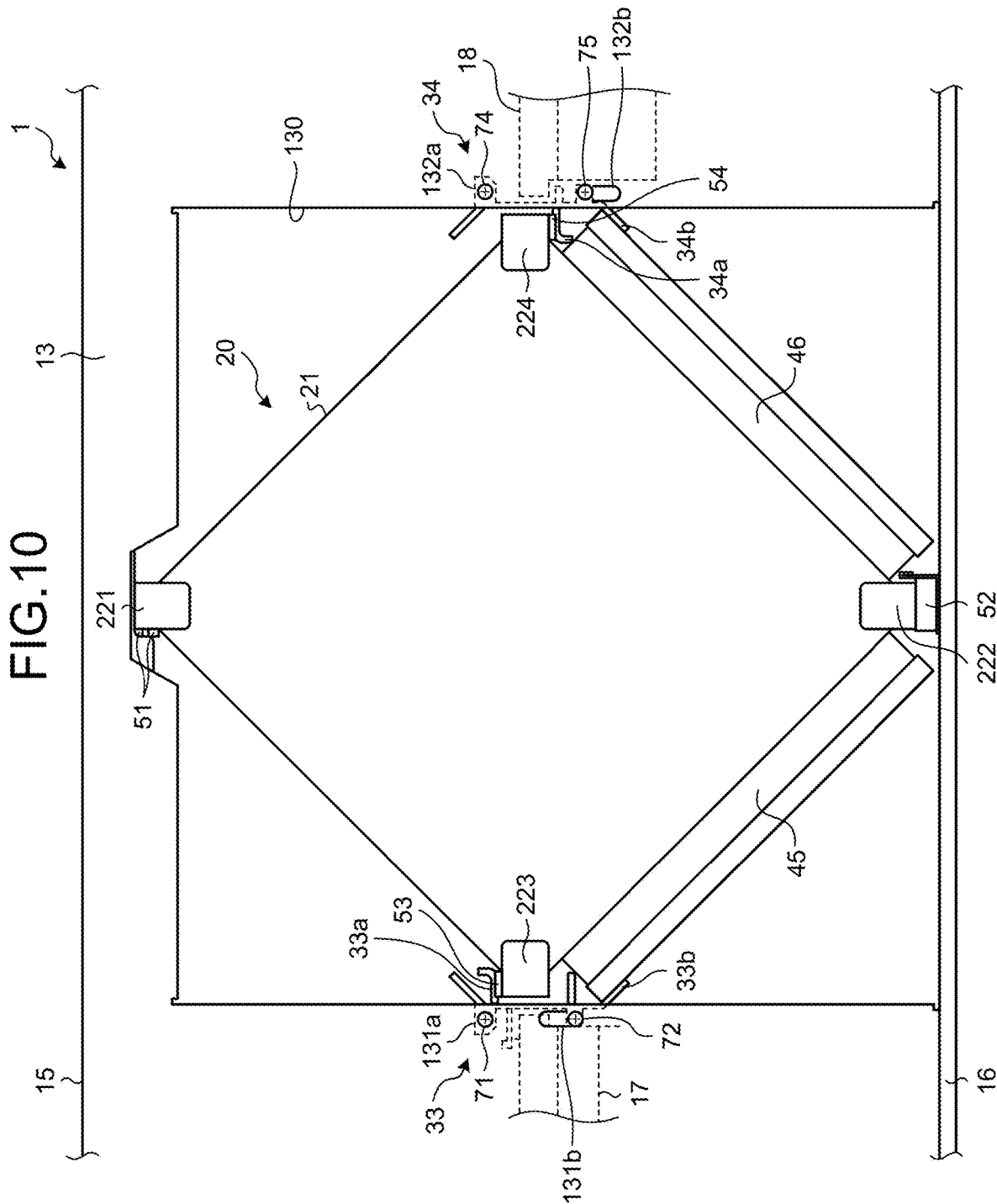
FIG. 10 is a front view illustrating the heat-exchanging ventilation device with the heat exchanger attached.
Figure 11:
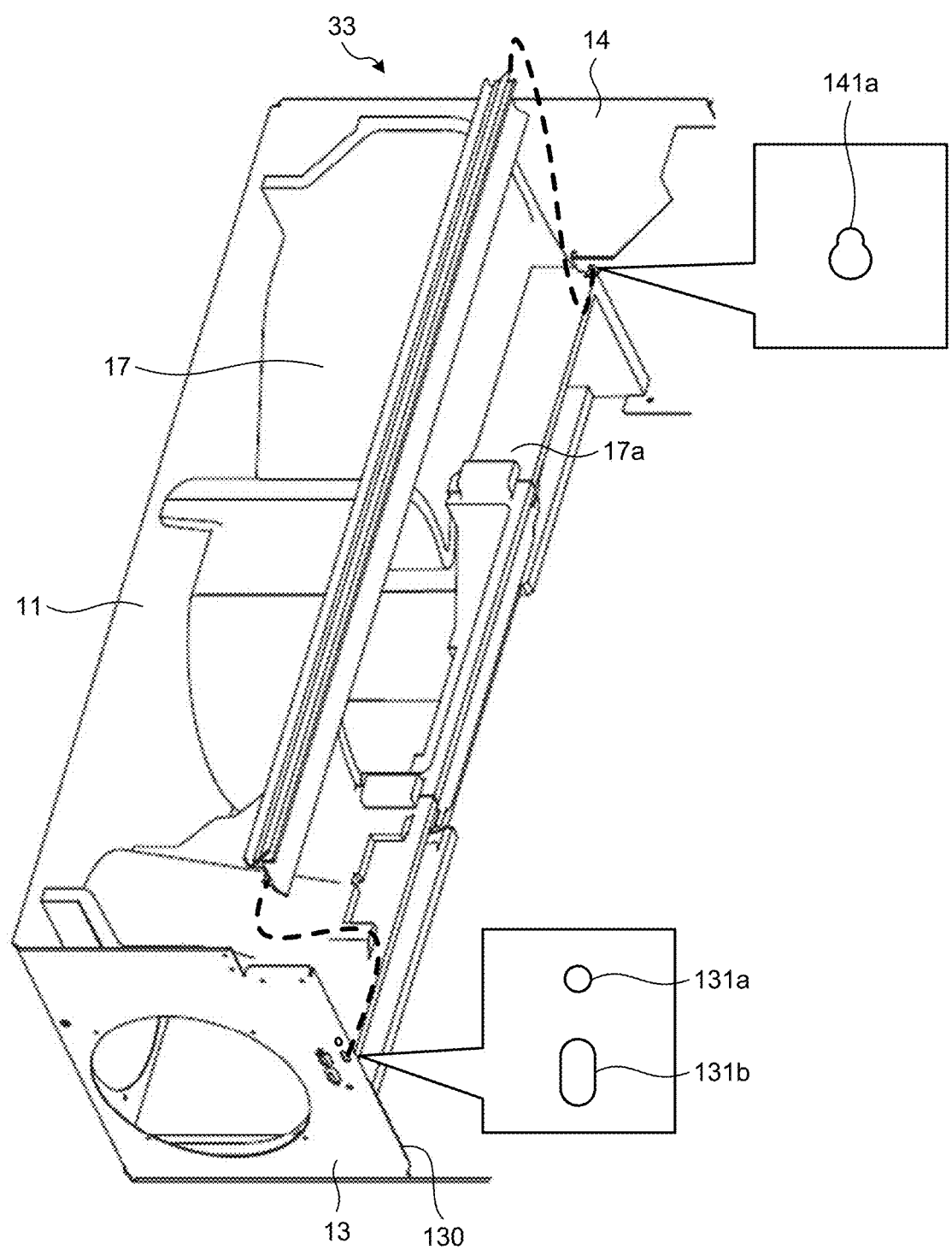
FIG. 11 is an exploded perspective view illustrating the position where a first movable rail is attached to the casing.

Next, the configuration to attach the first movable rail 33 and the second movable rail 34 to the casing 10 is described. FIG. 10 is a front view illustrating the heat-exchanging ventilation device 1 with the heat exchanger 20 attached. FIG. 11 is an exploded perspective view illustrating the position where the first movable rail 33 is attached to the casing 10. FIG. 10 illustrates a state in which the maintenance cover 40 has been removed from the third side plate 13.

As illustrated in FIGS. 10 and 11, the third side plate 13 of the casing 10 has a first fastening hole 131a and a first elongated hole 131b that are provided to attach the first movable rail 33 to the third side plate 13. The first elongated hole 131b is formed on the lower side of the first fastening hole 131a, i.e., closer to the bottom plate 16 than the first fastening hole 131a. The first elongated hole 131b extends in a direction perpendicular to the axial direction X of the heat exchange element 21 and in the vertical direction Y. As illustrated in FIG. 11, the fourth side plate 14 of the casing 10 includes a first connecting hole 141a provided to attach the first movable rail 33 to the fourth side plate 14. The first connecting hole 141a is a single hole combining a smaller-diameter portion and a larger-diameter portion. In the first connecting hole 141a, the smaller-diameter portion is formed on the upper side of the larger-diameter portion, i.e., closer to the top plate 15 than the larger-diameter portion.

Figure 12:
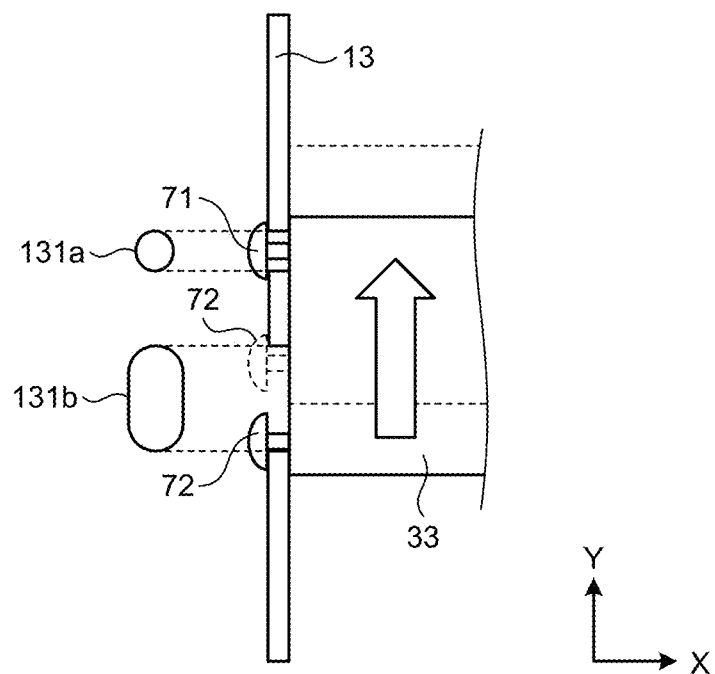
FIG. 12 is a cross-sectional view illustrating an attachment portion of a third side plate to which the first movable rail is attached.
Figure 13:
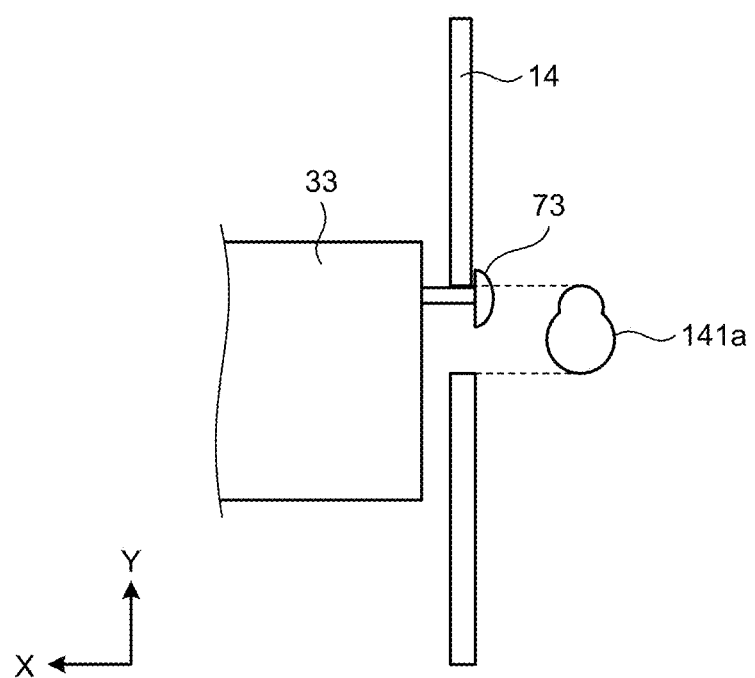
FIG. 13 is a cross-sectional view illustrating an attachment portion of a fourth side plate to which the first movable rail is attached.

FIG. 12 is a cross-sectional view illustrating an attachment portion of the third side plate 13 to which the first movable rail 33 is attached. FIG. 13 is a cross-sectional view illustrating an attachment portion of the fourth side plate 14 to which the first movable rail 33 is attached. As illustrated in FIG. 12, the first movable rail 33 has screw holes at its end portion closer to the third side plate 13. Each of the screw holes is formed with a female thread into which a screw 71 or a screw 72 is screwed. When the heat exchanger 20 is in an attached state as illustrated in FIG. 10, the first movable rail 33 is fastened and fixed to the third side plate 13 by the screw 71 inserted through the first fastening hole 131a in the third side plate 13 and by the screw 72 inserted through the lower part of the first elongated hole 131b in the third side plate 13.

As illustrated in FIG. 13, the first movable rail 33 has a screw hole at its end portion closer to the fourth side plate 14. The screw hole is formed with a female thread into which a screw 73 retained in the smaller-diameter portion of the first connecting hole 141a is screwed in advance. The head of the screw 73 is sized to pass through the larger-diameter portion of the first connecting hole 141a. As described above, when the first movable rail 33 is fixed to the third side plate 13 and the fourth side plate 14, i.e., when the heat exchanger 20 is in an attached state, the first movable rail 33 presses against the third frame member 223 of the heat exchanger 20 from the upper side, i.e., from the side where the top plate 15 is present. As a result, in a state in which the first movable rail 33 is fastened and fixed to the third side plate 13, the first movable rail 33 receives an upward force as a reaction force from the heat exchanger 20. Therefore, as long as the head of the screw 73 is retained in the smaller-diameter portion of the first connecting hole 141a, it is possible to fix the first movable rail 33 to the fourth side plate 14.

Figure 14:
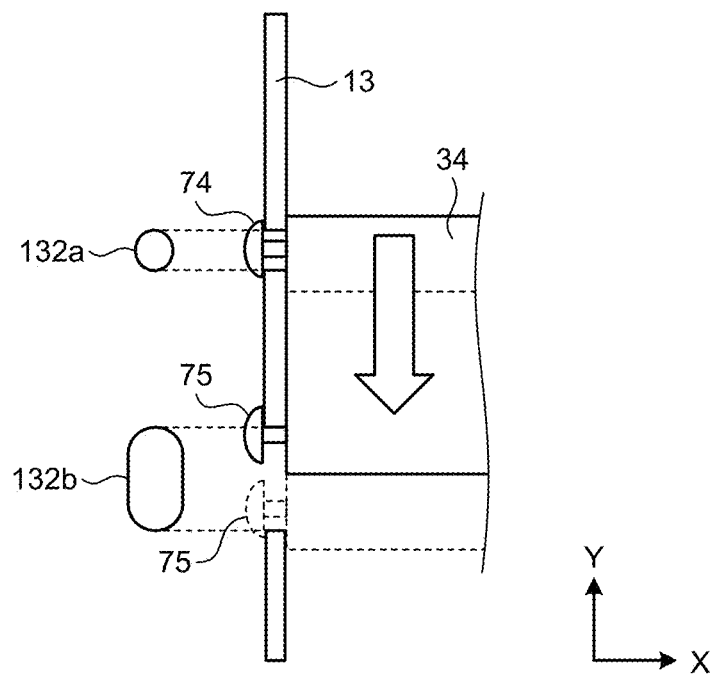
FIG. 14 is a cross-sectional view illustrating an attachment portion of the third side plate to which a second movable rail is attached.
Figure 15:
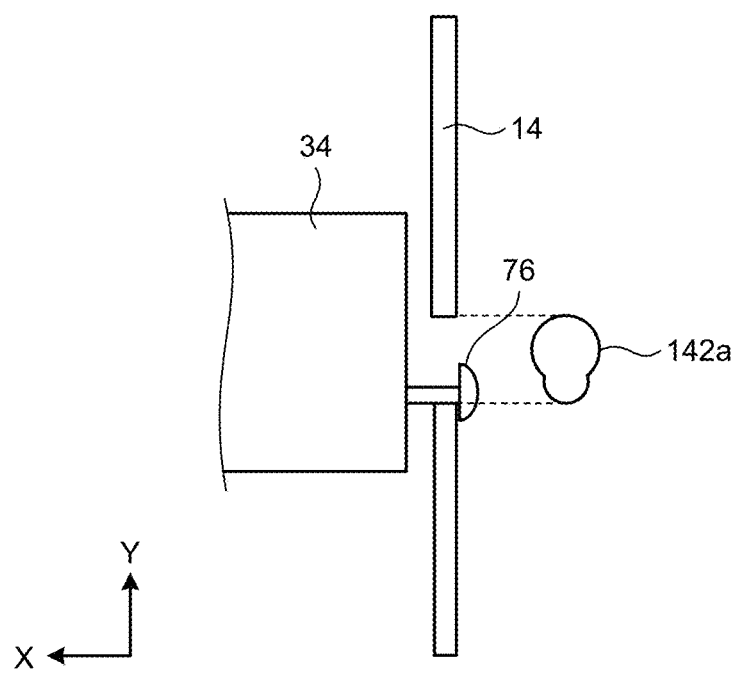
FIG. 15 is a cross-sectional view illustrating an attachment portion of the fourth side plate to which the second movable rail is attached.

FIG. 14 is a cross-sectional view illustrating an attachment portion of the third side plate 13 to which the second movable rail 34 is attached. FIG. 15 is a cross-sectional view illustrating an attachment portion of the fourth side plate 14 to which the second movable rail 34 is attached. As illustrated in FIGS. 10 and 14, the third side plate 13 of the casing 10 has a second fastening hole 132a and a second elongated hole 132b that are provided to attach the second movable rail 34 to the third side plate 13. The second elongated hole 132b is formed on the lower side of the second fastening hole 132a, i.e., closer to the bottom plate 16 than the second fastening hole 132a. The second elongated hole 132b extends in a direction perpendicular to the axial direction X of the heat exchange element 21 and in the vertical direction Y. As illustrated in FIG. 15, the fourth side plate 14 of the casing 10 has a second connecting hole 142a provided to attach the second movable rail 34 to the fourth side plate 14. The second connecting hole 142a is a single hole combining a smaller-diameter portion and a larger-diameter portion. In the second connecting hole 142a, the smaller-diameter portion is formed on the lower side of the larger-diameter portion, i.e., closer to the bottom plate 16 than the larger-diameter portion.

As illustrated in FIG. 14, the second movable rail 34 has screw holes at its end portion closer to the third side plate 13. Each of the screw holes is formed with a female thread into which a screw 74 or a screw 75 is screwed. When the heat exchanger 20 is in an attached state as illustrated in FIG. 10, the second movable rail 34 is fastened and fixed to the third side plate 13 by the screw 74 inserted through the second fastening hole 132a in the third side plate 13 and by the screw 75 inserted through the upper part of the second elongated hole 132b in the third side plate 13.

As illustrated in FIG. 15, the second movable rail 34 has a screw hole at its end portion closer to the fourth side plate 14. The screw hole is formed with a female thread into which the screw 76 retained in the smaller-diameter portion of the second connecting hole 142a is screwed in advance. The head of the screw 76 is sized to pass through the larger-diameter portion of the second connecting hole 142a. As described above, when the second movable rail 34 is fixed to the third side plate 13 and the fourth side plate 14, i.e., when the heat exchanger 20 is in an attached state, the second movable rail 34 presses against the fourth frame member 224 of the heat exchanger 20 from the lower side, i.e., from the side where the bottom plate 16 is present. As a result, in a state in which the second movable rail 34 is fastened and fixed to the third side plate 13, the second movable rail 34 receives a downward force as a reaction force from the heat exchanger 20. Therefore, as long as the head of the screw 76 is retained in the smaller-diameter portion of the second connecting hole 142a, it is possible to fix the second movable rail 34 to the fourth side plate 14.

When the first movable rail 33 fixed to the third side plate 13 and the fourth side plate 14 in the manner as described above are moved in a direction perpendicular to the axial direction X of the heat exchange element 21, the screw 71 is removed from the first movable rail 33 and the screw 72 is loosened. Then, the first movable rail 33 is moved upward while the screw 72 is moved along the first elongated hole 131b as illustrated by the dotted line in FIG. 12. At this point in time, the screw 73 remains retained in the smaller-diameter portion of the first connecting hole 141a in the fourth side plate 14. That is, the first movable rail 33 at an end portion closer to the third side plate 13 moves upward along a direction perpendicular to the axial direction X of the heat exchange element 21 while being fixed to the casing 10 at an end portion closer to the fourth side plate 14. Due to this movement, a downward force is no longer exerted on the third frame member 223 of the heat exchanger 20 by the first movable rail 33.

When the second movable rail 34 fixed to the third side plate 13 and the fourth side plate 14 are moved in a direction perpendicular to the axial direction X of the heat exchange element 21, the screw 74 is removed from the second movable rail 34 and the screw 75 is loosened. Then, the second movable rail 34 is moved downward while the screw 75 is moved along the second elongated hole 132b as illustrated by the dotted line in FIG. 14. At this point in time, the screw 76 remains retained in the smaller-diameter portion of the second connecting hole 142a in the fourth side plate 14. That is, the second movable rail 34 at an end portion closer to the third side plate 13 moves downward along a direction perpendicular to the axial direction X of the heat exchange element 21 while being fixed to the casing 10 at an end portion closer to the fourth side plate 14. Due to this movement, an upward force is no longer exerted on the fourth frame member 224 of the heat exchanger 20 by the second movable rail 34.

As described above, the first movable rail 33 and the second movable rail 34 are each fixed to the casing 10 at one end, i.e., at an end portion closer to the fourth side plate 14, and are each supported at the other end, i.e., at an end portion closer to the third side plate 13, such that they are movable in a direction perpendicular to the axial direction X of the heat exchange element 21. Consequently, the first movable rail 33 and the second movable rail 34 can move in a certain range in a direction perpendicular to the axial direction X of the heat exchange element 21 only by removing the screws 71 and 74 and loosening the screws 72 and 75 without removing the first movable rail 33 and the second movable rail 34 from the casing 10.

On the fourth side plate 14 located away from the third side plate 13 formed with the maintenance opening 130, the first movable rail 33 is retained in the smaller-diameter portion of the first connecting hole 141a with the screw 73 while the second movable rail 34 is retained in the smaller-diameter portion of the second connecting hole 142a with the screw 76. With this configuration, the first movable rail 33 and the second movable rail 34 can be fixed to and unfixed from the fourth side plate 14 only by moving the screw 73 between the smaller-diameter portion and the larger-diameter portion of the first connecting hole 141a and moving the screw 76 between the smaller-diameter portion and the larger-diameter portion of the second connecting hole 142a. Consequently, the first movable rail 33 and the second movable rail 34 can be easily attached to and detached from the casing 10.

Instead of screwing the screw 73 in advance into the end portion of the first movable rail 33 closer to the fourth side plate 14, this end portion may be formed with a protrusion that is insertable through the larger-diameter portion of the first connecting hole 141a and retainable in the smaller-diameter portion of the first connecting hole 141a. Instead of inserting the screw 76 in advance into the end portion of the second movable rail 34 closer to the fourth side plate 14, this end portion may be formed with a protrusion that is insertable through the larger-diameter portion of the second connecting hole 142a and retainable in the smaller-diameter portion of the second connecting hole 142a.

As described above, in the heat-exchanging ventilation device 1 according to the first embodiment, when the rotational force F is applied to the heat exchanger 20 in one direction by the first movable rail 33 and the second movable rail 34, which function as the rotational force applying unit 60, the heat exchanger 20 is pressed against the support members 30, which are the first fixed rail 31 and the second fixed rail 32 and against the first movable rail 33 and the second movable rail 34. With this configuration, the heat exchanger 20 can be supported by the support members 30, i.e., the first fixed rail 31, the second fixed rail 32, the first movable rail 33, and the second movable rail 34. Simultaneously, the heat exchanger 20 is brought into close contact with the support members 30, i.e., the first fixed rail 31, the second fixed rail 32, the first movable rail 33, and the second movable rail 34, so that an airtight seal can be ensured. When the first movable rail 33 and the second movable rail 34, which function as the rotational force applying unit 60, are separated from the heat exchanger 20 and thus application of the rotational force F to the heat exchanger 20 in one direction by the first movable rail 33 and the second movable rail 34 is stopped, the heat exchanger 20 becomes rotatable in the other direction. Consequently, the heat exchanger 20 can be separated from the support members 30, i.e., the first fixed rail 31, the second fixed rail 32, the first movable rail 33, and the second movable rail 34. Thus, it is possible to easily insert and remove the heat exchanger 20 into and from the casing 10. Therefore, the heat-exchanging ventilation device 1 according to the first embodiment can provide a smooth sliding movement of the heat exchanger 20 and ensure an airtight seal between the heat exchanger 20 and the first fixed rail 31, the second fixed rail 32, the first movable rail 33, and the second movable rail 34.

The heat exchanger 20 includes the heat exchange element 21 having a prism shape and the frame members 22 attached to the respective sides 21a extending in the axial direction of the heat exchange element 21. The support members 30 are located surrounding the heat exchanger 20 and support the frame members 22. With this configuration, the heat exchanger 20 can be stably supported by the support members 30. The first frame member 221, the second frame member 222, the third frame member 223, and the fourth frame member 224 are formed separately from each other to be attached to the respective sides 21a of the heat exchanger 20. The first frame member 221, the second frame member 222, the third frame member 223, and the fourth frame member 224, however, may be formed integrally.

The support members 30 include the first fixed rail 31 and the second fixed rail 32 that are fixed to the casing 10 and also include the first movable rail 33 and the second movable rail 34 that are supported by the casing 10 such that they are movable in a direction perpendicular to the axial direction. The first fixed rail 31 includes the first contact portion 31a that extends in the axial direction of the heat exchange element 21, that is formed in front of the first frame member 221 in the one direction indicated by the circular arrow in FIG. 8, and that can come into contact with the end surface 51a of the sealing member 51 affixed to the first frame member 221. The second fixed rail 32 includes the first contact portion 32a that extends in the axial direction of the heat exchange element 21, that is formed in front of the second frame member 222 in the one direction indicated by the circular arrow in FIG. 8, and that can come into contact with the end surface 52a of the sealing member 52 affixed to the second frame member 222. The first movable rail 33 includes the second contact portion 33a that extends in the axial direction of the heat exchange element 21, that is formed in front of the third frame member 223 in the other direction indicated by the circular arrow in FIG. 9, and that can come into contact with the end surface 53a of the sealing member 53 affixed to the third frame member 223. The second movable rail 34 includes the second contact portion 34a that extends in the axial direction of the heat exchange element 21, that is formed in front of the fourth frame member 224 in the other direction indicated by the circular arrow in FIG. 9, and that can come into contact with the end surface 54a of the sealing member 54 affixed to the fourth frame member 224. The rotational force applying unit 60 moves in a direction perpendicular to the axial direction of the heat exchange element 21 so that the second contact portions 33a and 34a press against the third frame member 223 and the fourth frame member 224, respectively.

As described above, by using the first movable rail 33 and the second movable rail 34 as the support members 30 that support the heat exchanger 20 and also as the rotational force applying unit 60, the heat-exchanging ventilation device 1 can be provided with a mechanism to apply the rotational force F to the heat exchanger 20 without increasing the number of components of the heat-exchanging ventilation device 1 and without increasing its device size. All the support members 30 may be fixed rails and a separate mechanism to apply the rotational force F to the heat exchanger 20 may be provided in the casing 10.

In the heat-exchanging ventilation device 1 according to the first embodiment, the first movable rail 33 and the second movable rail 34 are provided singly on opposite sides across the plane A that passes through the sides 21a of the heat exchange element 21 and through the axial center 210 of the heat exchange element 21. The first movable rail 33 and the second movable rail 34 are positioned diagonally in the manner as described above. Thus, the rotational force F can be sufficiently and smoothly applied to the heat exchanger 20 from the first movable rail 33 and the second movable rail 34 through a simple operation. It is sufficient if at least one movable rail is provided. All the support members 30 may be movable rails.

The contact surface 101 between the end surface 51a of the sealing member 51 affixed to the first frame member 221 and the first contact portion 32a of the first fixed rail 31 extends parallel to the plane A. The contact surface 102 between the end surface 52a of the sealing member 52 affixed to the second frame member 222 and the second contact portion 32a of the second fixed rail 32 also extends parallel to the plane A. The contact surface 103 between the end surface 53a of the sealing member 53 affixed to the third frame member 223 and the second contact portion 33a of the first movable rail 33 extends parallel to the plane B. The contact surface 104 between the end surface 54a of the sealing member 54 affixed to the fourth frame member 224 and the second contact portion 34a of the second movable rail 34 also extends parallel to the plane B.

With such a configuration, even when the heat exchange element 21 contracts toward the axial center 21o, i.e., contracts along directions parallel to the plane A and the plane B, due to long-term use, compression of the sealing members 51, 52, 53, and 54 can still be maintained. Further, even when the heat exchange element 21 contracts toward the axial center 21o, i.e., contracts along the directions parallel to the plane A and the plane B, and thus the frame members 22 of the heat exchanger 20 move toward the axial center 210 in accordance with the contraction deformation of the heat exchange element 21, a sufficient length of the contact surfaces 101, 102, 103, and 104 can still be maintained. As a result, the sealing properties are maintained between the supply air passage and the discharge air passage over a long time. The contact surfaces 101 and 102 may be inclined relative to the plane A as long as the contact surfaces 101 and 102 can provide satisfactory sealing between the supply air passage and the discharge air passage. The contact surfaces 103 and 104 may also be inclined relative to the plane B as long as the contact surfaces 103 and 104 can provide satisfactory sealing between the supply air passage and the discharge air passage.

The first movable rail 33 and the second movable rail 34 are each fixed to the casing 10 at one end, i.e., at an end portion closer to the fourth side plate 14, and are each supported by the casing 10 at the other end, i.e., at an end portion closer to the third side plate 13, such that they are movable in a direction perpendicular to the axial direction of the heat exchange element 21. Consequently, the first movable rail 33 and the second movable rail 34 can move in a certain range in a direction perpendicular to the axial direction of the heat exchange element 21 without removing the first movable rail 33 and the second movable rail 34 from the casing 10. The first movable rail 33 and the second movable rail 34 may each be supported at an end portion closer to the fourth side plate 14 such that they are movable in a direction perpendicular to the axial direction X of the heat exchange element 21 as with the end portion closer to the third side plate 13.

The first contact portion 31a of the first fixed rail 31 comes into contact with the first frame member 221 via the sealing member 51. The first contact portion 32a of the second fixed rail 32 comes into contact with the second frame member 222 via the sealing member 52. The second contact portion 33a of the first movable rail 33 comes into contact with the third frame member 223 via the sealing member 53. The second contact portion 34a of the second movable rail 34 comes into contact with the fourth frame member 224 via the sealing member 54. This can provide satisfactory sealing between the first frame member 221 and the first fixed rail 31, between the second frame member 222 and the second fixed rail 32, between the third frame member 223 and the first movable rail 33, and between the fourth frame member 224 and the second movable rail 34.

Second Embodiment

Figure 16:
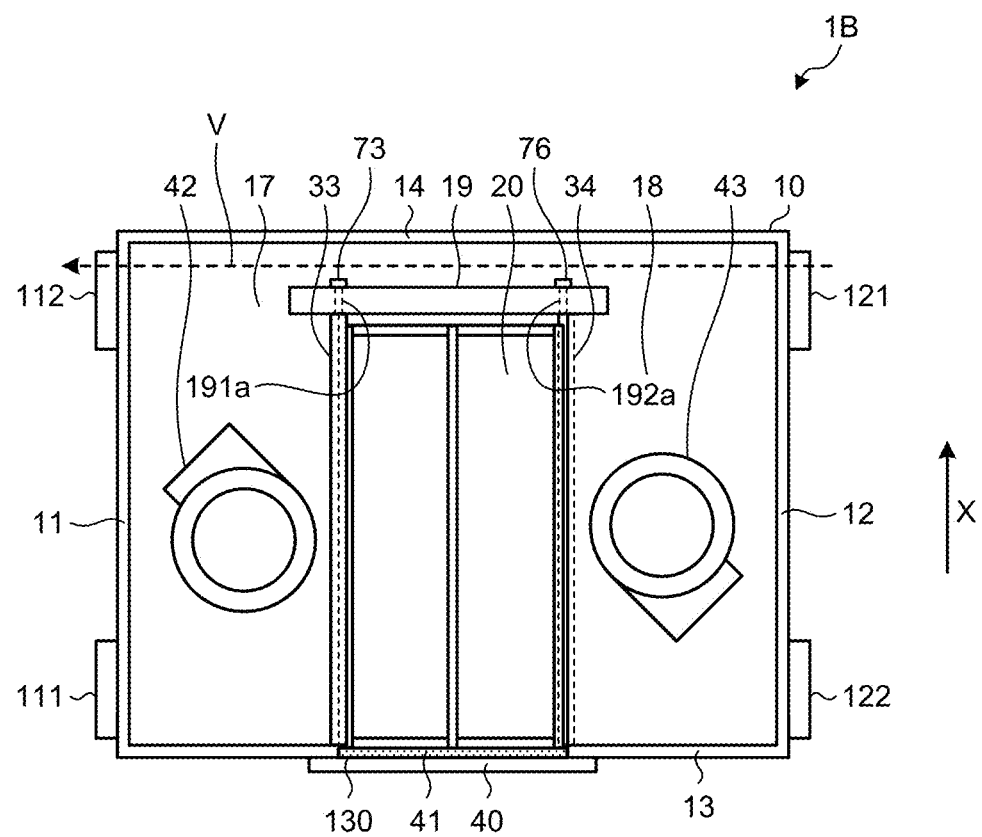
FIG. 16 is a schematic plan view illustrating a heat-exchanging ventilation device according to a second embodiment.

FIG. 16 is a schematic plan view illustrating a heat-exchanging ventilation device 1B according to a second embodiment. As illustrated in FIG. 16, in addition to the configuration of the heat-exchanging ventilation device 1 according to the first embodiment, the heat-exchanging ventilation device 1B has a bypass flow path V that directs discharge airflow flowing in a discharge airflow path from the upstream side to the downstream side of the heat exchanger 20 without passing through the heat exchanger 20 and moreover, the heat-exchanging ventilation device 1B includes a separating plate 19 used to form the bypass flow path V. A flow-path switching damper (not illustrated) switches the flow path for the discharge airflow between the heat exchanger 20 and the bypass flow path V. The separating plate 19 is provided closer to the fourth side plate 14 than the heat exchanger 20, and it is fixed to the casing 10. In the heat-exchanging ventilation device 1B, when the heat exchanger 20 is attached to the casing 10, the end surface of the heat exchanger 20 closer to the fourth side plate 14 comes into contact with the separating plate 19. In the present embodiment, the bypass flow path V is provided for discharge airflow. However, the bypass flow path V may be provided for supply airflow. In such a case, the separating plate 19 forms the bypass flow path V that directs supply airflow flowing in a supply airflow path from the upstream side to the downstream side of the heat exchanger 20 without passing through the heat exchanger 20. Although not illustrated, a unit to direct air from the exterior-side inlet port 111, through which discharge airflow is drawn, to the bypass flow path V and a unit to direct air from the interior-side inlet port 121, through which supply airflow is drawn, to the bypass flow path V may have any configuration as long as these units can direct air from their respective inlet ports to the bypass flow path V.

A first connecting hole 191a and a second connecting hole 192a are formed in the separating plate 19. The first connecting hole 191a has the same shape as the first connecting hole 141a formed in the fourth side plate 14 of the heat-exchanging ventilation device 1 according to the first embodiment. The second connecting hole 192a has the same shape as the second connecting hole 142a formed in the fourth side plate 14 of the heat-exchanging ventilation device 1 according to the first embodiment. In the heat-exchanging ventilation device 1B, the first movable rail 33 is retained at one end, i.e., at an end portion closer to the fourth side plate 14, by the screw 73 retained in a smaller-diameter portion of the first connecting hole 191a in the separating plate 19, which is a component fixed to the casing 10. The second movable rail 34 is retained at one end, i.e., at an end portion closer to the fourth side plate 14, by the screw 76 retained in a smaller-diameter portion of the second connecting hole 192a in the separating plate 19, which is a component fixed to the casing 10. The configuration of the attachment portion of each of the first movable rail 33 and the second movable rail 34 at the other end, i.e., at an end portion closer to the third side plate 13, is the same as that in the heat-exchanging ventilation device 1 according to the first embodiment.

As described above, in the heat-exchanging ventilation device 1B according to the second embodiment, the first movable rail 33 and the second movable rail 34 are each fixed at one end to the component fixed to the casing 10, i.e., the separating plate 19, while being supported at the other end by the third side plate 13 of the casing 10 such that they are movable in a direction perpendicular to the axial direction X of the heat exchange element 21. Consequently, the first movable rail 33 and the second movable rail 34 can move in a certain range in a direction perpendicular to the axial direction of the heat exchange element 21 without removing the first movable rail 33 and the second movable rail 34 from the casing 10 and from the separating plate 19. As long as the first movable rail 33 and the second movable rail 34 are operable through the maintenance opening 130, the first movable rail 33 and the second movable rail 34 may each be supported at an end portion closer to the third side plate 13 of the casing 10 by a member that is fixed to the casing 10 and that is other than the third side plate 13 such that they are movable in a direction perpendicular to the axial direction X of the heat exchange element 21. The first movable rail 33 and the second movable rail 34 may each be supported at an end portion attached to the separating plate 19 such that they are movable in a direction perpendicular to the axial direction X of the heat exchange element 21 as with the end portion closer to the third side plate 13.

In the first and second embodiments, the present invention is applied to the total-heat-exchanging ventilation devices 1 and 1B. However, the present invention may also be applied to sensible-heat-exchanging ventilation devices. Further, in the first and second embodiments, a single heat exchanger 20 is used. However, a plurality of heat exchangers 20 may be inserted in series into the casing 10. In this case, a sealing member is arranged between the heat exchangers 20 to ensure an airtight seal between the heat exchangers 20.

The configurations described in the above embodiments are only examples of the content of the present invention. The configurations can be combined with other well-known techniques, and a part of each of the configurations can be omitted or modified without departing from the scope of the present invention.

REFERENCE SIGNS LIST 1 heat-exchanging ventilation device, 10 casing, 11 first side plate, 111 exterior-side inlet port, 112 exterior-side discharge port, 12 second side plate, 121 interior-side inlet port, 122 interior-side outlet port, third side plate, 130 maintenance opening, 131a first fastening hole, 131b first elongated hole, 132a second fastening hole, 132b second elongated hole, 14 fourth side plate, 141a first connecting hole, 142a second connecting hole, 15 top plate, 16 bottom plate, 17 first casing, 17a end portion, 18 second casing, 18a end portion, 19 separating plate, 191a first connecting hole, 192a second connecting hole, 20 heat exchanger, 20a corner portion, 21 heat exchange element, 21a side, 21b end surface, 210 axial center, 22 frame member, 22a frame body, 22b convex portion, 22c convex distal end, 22d convex base end, 22t frame-side hook portion, 221 first frame member, 222 second frame member, 223 third frame member, 224 fourth frame member, 23 cover member, 23a cover body, 23b concave portion, 23c concave distal end, 23d concave base end, 23t cover-side hook portion, 231 corner portion, 24 connecting portion, 25, 26 clearance, 30 support member, 31 first fixed rail, 31a, 32a first contact portion, 32 second fixed rail, 33 first movable rail, 34 second movable rail, 33a, 34a second contact portion, 33b, 34b filter support portion, maintenance cover, 41 sealing member, 42 discharge air blower, 43 supply air blower, 44 handle, 45, 46 filter, 51, 52, 53, 54, 55, 56 sealing member, 51a, 52a, 53a, 54a end surface, 60 rotational force applying unit, 71, 72, 73, 74, 75, 76 screw, 101, 102, 103, 104 contact surface.

The invention claimed is:

1. A heat-exchanging ventilation device to perform ventilation while exchanging heat between a supply airflow and a discharge airflow, the heat-exchanging ventilation device comprising:

a casing;

a heat exchanger having a prism shape and accommodated in the casing to be insertable into and removable from the casing;

a plurality of support members to support the heat exchanger in the casing; and a rotational force applier configured to apply a rotational force to the heat exchanger and rotate the heat exchanger, wherein when a rotational force is applied to the heat exchanger in one direction by the rotational force applier, the heat exchanger is pressed against the support members, and when application of a rotational force in the one direction by the rotational force applier is stopped, the heat exchanger becomes rotatable in another direction, wherein the heat exchanger includes a heat exchange element having a prism shape and a frame member attached to a side extending in an axial direction of the heat exchange element, and the support members are located surrounding the heat exchanger and support the frame member, and the support members include
- a plurality of fixed rails fixed to the casing, and
- a plurality of movable rails supported by the casing or a member fixed to the casing such that the movable rails are movable in a direction perpendicular to the axial direction, the fixed rails include a first contact portion that extends in the axial direction, is formed in front of the frame member in the one direction, and is capable of coming into contact with the frame member, the movable rails include a second contact portion that extends in the axial direction, is formed in front of the frame member in the another direction, and is capable of coming into contact with the frame member, and the rotational force applier is the movable rails that move in a direction perpendicular to the axial direction such that the second contact portion presses against the frame member.

2. The heat-exchanging ventilation device according to claim 1, wherein the movable rails are provided at least singly on opposite sides across a plane passing through the side of the heat exchange element and passing through an axial center of the heat exchange element.

3. The heat-exchanging ventilation device according to claim 1, wherein a contact surface between the first contact portion and the frame member and a contact surface between the second contact portion and the frame member extend parallel to a plane passing through the side of the heat exchange element and passing through an axial center of the heat exchanger.

4. The heat-exchanging ventilation device according to claim 1, wherein the movable rails are fixed at one end to the casing or to a member fixed to the casing, while being supported at another end by the casing or a member fixed to the casing such that the movable rails are movable in a direction perpendicular to the axial direction.

5. The heat-exchanging ventilation device according to claim 1, wherein
a separating plate is fixed to the casing, the separating plate forming a bypass flow path to direct either one of the supply airflow and the discharge airflow from an upstream side to a downstream side of the heat exchanger, and the movable rails are fixed at one end to the separating plate, while being supported at another end by the casing such that the movable rails are movable in a direction perpendicular to the axial direction.

6. The heat-exchanging ventilation device according to claim 1, wherein
the first contact portion of the fixed rails is in contact with the frame member via a sealing member, and the second contact portion of the movable rails is in contact with the frame member via a sealing member.

7. A method for attaching a heat exchanger using the heat-exchanging ventilation device according to claim 1, the method comprising:
inserting the heat exchanger into the casing in a state of being separated from the support members; and
applying a rotational force in one direction to the heat exchanger and pressing the heat exchanger against the support members after the heat exchanger is inserted into the casing.

8. A method for detaching a heat exchanger using the heat-exchanging ventilation device according to claim 1, the method comprising:
stopping application of a rotational force in one direction to the heat exchanger that is pressed against the support members due to application of the rotational force in the one direction to the heat exchanger; and
rotating the heat exchanger in the other direction and removing the heat exchanger from the casing in a state in which the heat exchanger is separated from the support members after application of a rotational force in the one direction to the heat exchanger is stopped.

* * * * *